United States Patent [19]

Brecker

[11] 4,252,705
[45] Feb. 24, 1981

[54] RESISTANCE OF POLYVINYL CHLORIDE RESINS TO DISCOLORATION DURING DRYING WITH N,N'-DIPHENYL UREA

[75] Inventor: Lawrence R. Brecker, Brooklyn, N.Y.

[73] Assignee: Argus Chemical Corporation, Brooklyn, N.Y.

[21] Appl. No.: 973,488

[22] Filed: Dec. 26, 1978

[51] Int. Cl.³ .............................................. C08L 27/06
[52] U.S. Cl. ...................... 260/29.6 MN; 260/45.7 P; 260/45.8 A; 260/45.75 K; 260/45.9 NC; 526/217; 526/344; 526/344.2; 526/345; 528/492
[58] Field of Search ................. 260/29.6 MN, 45.7 P, 260/45.8 A, 45.75 K, 45.9 NC; 526/344.2, 217, 344, 345; 528/492

[56] References Cited

U.S. PATENT DOCUMENTS 3,051,675   8/1962   Glueck et al. ............. 260/29.6 MN Primary Examiner—Harold D. Anderson

[57] ABSTRACT

The resistance of polyvinyl chloride resins to the development of yellow to orange reversible discoloration when heated in the presence of water at moderately elevated temperatures above 80° C. up to about 160° C. is improved by combining therewith an N,N'-diphenyl urea. Such reversible discoloration is not associated with any heat instability, and the resistance of the polyvinyl chloride resin to deterioration when heated at processing temperatures of 150° C. and above is then improved by incorporation of the usual polyvinyl chloride resin heat stabilizers.

39 Claims, No Drawings

RESISTANCE OF POLYVINYL CHLORIDE RESINS TO DISCOLORATION DURING DRYING WITH N,N'-DIPHENYL UREA

Polyvinyl chloride resins are normally prepared commercially in an aqueous medium, by suspension or emulsion polymerization of, inter alia, vinyl chloride monomer. The resinous product is then dried, to produce the particulate polyvinyl chloride resin that is supplied to resin compounders and converters.

The drying of the suspension or emulsion polymerized reaction product can be carried out at moderate temperatures up to 80° C. by various standardized techniques. The drying is normally carried out at moderate temperatures to avoid the development of a reversible yellow to orange discoloration of the polyvinyl chloride resin, which occurs in the presence of water at temperatures above about 80° C. during drying. The product from emulsion polymerization is generally recovered by spray drying, and the product of suspension polymerization by flash drying, using a relatively low temperature air stream, from which polymer particles are recovered in, for example, a cyclone separator. The product may not be fully dry in one pass, and a second pass can be used, or, alternatively, a rotary dryer or fluidized bed techniques can be employed.

The drying of aqueous polyvinyl chloride resin emulsions and suspensions has not posed a problem until rather recently. The dried product normally contains a small amount, approximately 2000 ppm, of residual vinyl chloride monomer, which is retained in the resin. However, recently it has become important to reduce the amount of vinyl chloride monomer still further, to from 1 to 5 ppm, and, if possible, to even less than zero. This has posed a problem because the removal of the relatively small amounts of vinyl chloride monomer has necessitated steam-stripping the resin at temperatures above the 80° C. normally used in the drying step. Then the polyvinyl chloride resin is stripped at temperatures high enough to efficiently remove the vinyl chloride monomer, of the order of from 125° to 160° C., a new kind of discoloration has appeared, in which the dry powder is a light yellow to light orange, rather than the desired white color.

This color does not arise from heat deterioration of the polymer, nor is it a mild form of the usual heat discoloration of a polymer arising from decomposition. The discoloration has its origin in other causes, which at present are unknown. It is however reversible, and the fact that it is reversible demonstrates that it is not associated with a decomposition of the resin, since decomposition is irreversible.

It has been discovered, as one aspect of the present invention, and not previously known, that the discoloration can in fact be discharged by heating the polymer in the presence of certain vinyl chloride polymer heat stabilizers. However, not all heat stabilizers are effective, and even when a heat stabilizer is effective, the length of time required to remove the color makes it impractical and uneconomic as a technique for eliminating this sort of discoloration.

In any event, the compounding of a polyvinyl chloride resin at this stage with a heat stabilizer is not acceptable to the resin compounders, who must be given their choice of heat stabilizer for use with the resin, for flexibility in selection of the end use. Some uses require some heat stabilizers, and other uses require other heat stabilizers, so that to compound the resin with a given heat stabilizer at this stage is, in effect, to restrict the end use of the polymer that is available to the compounders. It is therefore important to avoid this kind of discoloration without the use of a heat stabilizer that would impose limitations on the end use of the polymer, in terms of the heat stabilizers that may be incorporated with it later in the usual compounding procedures.

In accordance with the present invention, it has been determined that the kind of discoloration developed by polyvinyl chloride polymers when heated in the presence of water, such as is the course of drying, can be avoided by combining an N,N'-diphenyl urea with the polymer. The N,N'-diphenyl ureas are known heat stabilizers for polyvinyl chloride resins. However, not only do the N,N'-diphenyl ureas protect the polyvinyl chloride resin against the development of this discoloration when heated at elevated temperatures above 80° C. up to about 160° C. in the presence of water, but they do not interfere with the subsequent heat stabilization of the polymer by any of the various kinds of known polyvinyl chloride resin heat stabilizers. The N,N'-diphenyl ureas do not therefore restrict in any way the possible end use of the polymer. Accordingly, the polymer product produced by the process of the invention is susceptible of heat stabilization by any conventional polyvinyl chloride resin heat stabilizer, according to the end use intended for the polymer.

The N,N'-diphenyl ureas which can be employed in accordance with the invention include N,N'-diphenyl urea and substituted N,N'-diphenyl ureas. Thus, these N,N'-diphenyl ureas can be defined by the following general formula:

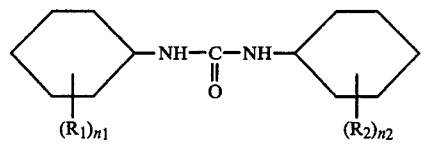

wherein:

$R_1$ and $R_2$ are selected from the group consisting of halogen, alkyl, cycloalkyl, and alkoxy of from one to about twenty carbon atoms; and $n_1$ and $n_2$ are integers from zero to five.

N,N'-diphenyl urea is the most available and least expensive of the N,N'-diphenyl ureas falling within the invention, and is therefore preferred.

Diphenyl urea and similar N-substituted ureas and thioureas are known heat stabilizers for polyvinyl chloride resins.

Voorthuis and van Dijk, U.S. Pat. No. 2,588,899, patented Mar. 11, 1952, discloses stabilizers for polymers having a molecular weight above 2000, comprising of three difference substances which are (1) an acid-neutralizing compound, (2) an oxidation inhibitor, and (3) a urea compound represented by the formula

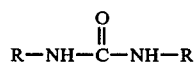

wherein R is hydrogen or a phenyl radical containing a nuclear-substituted sulfur-free polar group, at least one R being said substituted phenyl radical.

Pal et al *Rev. Chim.* (Bucharest) 10, 685–91 (1959) suggest that diphenyl urea is a satisfactory substitute for stannic stabilizers in inhibiting heat decomposition of polyvinyl chloride.

British Pat. No. 997,187, July 7, 1965, proposed combinations of diphenyl urea with calcium/zinc stearate, 2-phenyl-indole, pentaerythritol, and epichlorohydrin-diphenylolpropane condensation products.

Fikentscher U.S. Pat. No. 2,365,400, patented Dec. 19, 1944, suggests combinations of sodium carbonate with diphenyl, dinaphthyl and ditolyl thioureas as stabilizers for polyvinyl chloride resins.

The position of the $R_1$ and $R_2$ radicals on the phenyl nuclei is not critical: they may be ortho, meta or para. However, the compounds wherein the radicals $R_1$ and $R_2$ are in the para position are preferred, since they are easier to prepare.

Among the substituted N,N'-diphenyl ureas that can be employed are: the N,N'-di(ortho, meta or para-chlorophenyl) ureas; the N,N'-di(ortho, meta or para-bromophenyl) ureas; the N,N'-di(ortho, meta or para-methylphenyl) ureas; N,N'-di(2,4-dimethylphenyl) urea; the N,N'-di(ortho, meta or para-methoxyphenyl) ureas; the N,N'-di(ortho, meta or para-ethoxyphenyl) ureas; the N,N'-di(ortho, meta or para-n-butylphenyl) ureas; the N,N'-di(ortho, meta or para-n-pentylphenyl) ureas; N,N'-di(para-tert. amylphenyl) urea; N,N'-di(-para-cyclohexylphenyl) urea; N,N'-di(ortho, meta or para-n-octylphenyl) urea; N,N'-di(para-tert. octylphenyl) urea; N,N'-di(para-tert. nonylphenyl) urea; N,N'-di(para-dodecylphenyl) urea; N,N'-di(para-tetradecylphenyl) urea; N,N'-di(para-hexadecylphenyl) urea; and N,N'-di(para-octadecylphenyl) urea.

Very small amounts of N,N'-diphenyl ureas are effective. An amount as small as 0.005% can be employed. Generally excellent results are obtained in amounts of within the range from about 0.05 to about 1%. There is no need to employ more than 5% to obtain the desired inhibition of discoloration, and consequently amounts larger than this would be wasteful, but they can of course be employed. A practical upper limit is 10%. All proportions are by weight of the polymer.

The N,N'-diphenyl urea can be incorporated directly in aqueous composition containing the polymer which is to be heated to remove vinyl chloride monomer and/or dried. The diphenyl urea can also be added before or during polymerization of the vinyl chloride monomer to form polyvinyl chloride without ill effect. Aqueous suspension polymerization and emulsion polymerization reaction mixtures and reaction products and media are exemplary of aqueous systems to which the invention is applicable.

The aqueous media obtained as a result of suspension and emulsion polymerization techniques can have a pH varying over a wide range, from the acid through the basic side. The N,N'-diphenyl ureas in accordance with the invention are however effective in aqueous media at a pH range of from about 3 to about 11, without diminution in discoloration-inhibiting effectiveness.

The stabilized composition can be formed by simply mixing the individual ingredients in the presence of water. It is frequently helpful to combine the N,N'-diphenyl urea with solvent and water. Another helpful expedient is to prepare the N,N'-diphenyl urea in the form of an aqueous emulsion. Such an emulsion can be added to a polymer suspension or emulsion before the polymer is isolated by the usual drying procedures, such as spray-drying, flash-drying, or steam-stripping. A "masterbatch" technique can be utilized to provide both wet and dry combinations of the stabilizer composition with the polymer in proportions for compounding into larger quantities of polymer to be stabilized.

The N,N'-diphenyl ureas of the invention can be used with any halogen-containing resin, such as polyvinyl chloride resin. The term "polyvinyl chloride" as used herein is inclusive of any polymer formed at least in part of the recurring group:

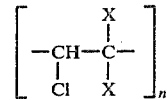

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers, but also after-chlorinated polyvinyl chlorides as a class, for example, those disclosed in British Pat. No. 893,288, and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene, propylene, or ethylene. The invention also is applicable to mixtures of polyvinyl chloride in a major proportion with a minor proportion of other synthetic resins such as chlorinated polyethylene or a copolymer of acrylonitrile, butadiene and styrene.

After processing of the polymer is complete, the resulting polymer can be formulated or compounded and stabilized against heat deterioration at more elevated processing temperatures, above 150° C.

The invention is of application to the preparation of rigid polyvinyl chloride resin compositions, that is, resin compositions which are formulated to withstand high processing temperatures, of the order of 190° C. and higher, as well as to plasticized polyvinyl chloride resin compositions of conventional formulation, where resistance to heat distortion is not a requisite. Conventional plasticizers well known to those skilled in the art can be employed such as, for example, dioctyl phthalate, octyl diphenyl phosphate and epoxidized soybean oil.

Particularly useful plasticizers are the epoxy higher esters having from twenty-two to one hundred fifty carbon atoms. Such esters will initially have had unsaturation in the alcohol or acid portion of the molecule, which is taken up by the formation of the epoxy group.

Typical unsaturated acidds are acrylic, oleic, linoleic, linolenic, erucic, ricinoleic and brassidic acids, and these may be esterified with organic monohydric or polyhydric alcohols, the total number of carbon atoms of the acid and the alcohol being with the range stated. Typical monohydric alcohols include butyl alcohol, 2-ethyl hexyl alcohol, lauryl alcohol, isooctyl alcohol, stearyl alcohol and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerine is preferred. These alcohols may be fully or partially esterified with the epoxidized acid. Also useful are the epoxidized mixtures of higher fatty acid esters found in naturally-occurring oils such as epoxidized coconut oil and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The N,N'-diphenyl ureas of the invention do not afford an adequate resistance to deterioration at elevated temperatures, and therefore the addition of conventional heat stabilizers for polyvinyl chloride resins is required.

Many heat stabilizers are known to the art. Among the more important heat stabilizers in commercial use are mild alkalis such as sodium carbonate, disodium phosphate, and sodium and potassium salts of partially esterified phosphoric acids; inorganic and organic lead salts; organotin carboxylates, as disclosed by Quattlebaum in U.S. Pat. No. 2,307,157; organotin mercaptides as disclosed by Leistner in U.S. Pat. Nos. 2,641,596, 2,726,227 and 2,726,254; organotin mercapto carboxylic acid esters, as disclosed by Leistner et al in U.S. Pat. Nos. 2,641,596; 2,641,588, and 2,752,325; organotin xanthates, as disclosed by Leistner et al in U.S. Pat. No. 2,759,906; organotin mercapto alcohol esters as disclosed by Leistner et al U.S. Pat. Nos. 2,870,119; 2,870,182; 2,870,468 and 2,883,363; organotin mercapto carboxylic acid ester sulfides, as disclosed by Kauder et al, U.S. Pat. No. 3,565,930 and Brecker U.S. Pat. No. 3,565,931, and mixtures of organotin sulfides and organotin mercaptocarboxylic acid esters, as disclosed by Kauder in U.S. Pat. No. 3,632,538; various metal-free organic compounds such as the polyols, e.g., mannitol, sorbitol, glycerol, pentaerythritol, 1,2-epoxides, e.g., soybean oil epoxide, isooctyl epoxystearate, and the diglycidyl ether of 2,2-bis(p-hydroxyphenyl)propane, and nitrogen compounds, e.g., phenylurea, N,N'-diphenyl-thiourea, and 2-phenyl indole. For detailed discussion of heat stabilizers for vinyl halide resins, reference may be made to the articles by N. L. Perry, *Barium-Cadmium Stabilization of Polyvinyl Chloride*, Rubber Age 85, 449–452 (June 1959) and by H. Verity-Smith, British Plastics 27, 176–179, 213–217, 307–311 (1954), the brochure by the same author, *The Development of the Organotin Stabilizer* (Tin Research Instituted, 1959), and the book, *La Stabilization des Chlorures de Polyvinyle*, by F. Chevassus (Amphora, Paris, 1957).

Preferred classes of additional heat stabilizers which can be used include the organic phosphites and polyvalent metal salts of non-nitrogeneous organic carboxylic acids.

The triphosphite can be any organic triphosphite having attached to phosphorus through oxygen or sulfur groups selected from aryl, alkyl, cycloalkyl, aralkyl and alkaryl groups, in any combinations, such as, three monovalent groups $(RA)_3P$; one monovalent group and one bivalent group, forming a heterocyclic ring with the phosphorus,

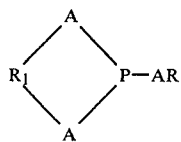

a plurality of bivalent groups forming polymers therewith,

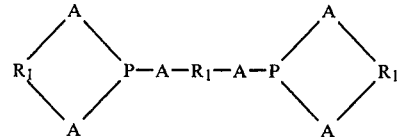

one trivalent group,

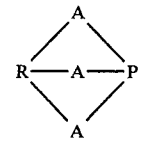

and a plurality of trivalent groups forming polymers therewith,

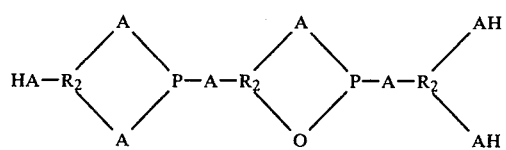

and any combinations of monovalent, bivalent and trivalent groups to form monomeric and polymeric phosphites; wherein A is oxygen or sulfur. The term "organic phosphite triester" as used herein is inclusive of oxo, thio than about sixty carbon atoms.

Exemplary are monophenyl di-2-ethyl hexyl phosphite, diphenyl mono-2-ethyl hexyl phosphite, diisooctyl monotolyl phosphite, tri-2-ethyl hexyl phosphite, phenyl dicyclohexyl phosphite, phenyl diethyl phosphite, triphenyl phosphite, tricresyl phosphite, tri(dimethylphenyl) phosphite, trioctadecyl phosphite, triisooctyl phosphite, tridodecyl phosphite, isooctyl diphenyl phosphite, diisooctyl phenyl phosphite, tri(t-octylphenyl) phosphite, tri(t-nonylphenyl)phosphite, isooctyl di(octylphenyl) phosphite, di(2-ethylhexyl) (isooctylphenyl) phosphite, tri(2-cyclohexylphenyl) phosphite, tri-α-naphthyl phosphite, tri(phenylphenyl) phosphite, tri(2-phenyl ethyl) phosphite, tridodecyl thiophosphite, tri-p-tert-butyl phenyl thiophosphite, dodecyl thiodiphenyl phosphite, tert-butyl phenyl tio-di-2-ethylhexyl phosphite, ethylene phenyl phosphite, ethylene t-butyl phosphite, ethylene isohexyl phosphite, ethylene isooctyl phosphite, ethylene cyclohexyl phosphite, 2-phenoxy-1,3,2-dioxaphosphorinane, 2-butoxy-1,3,2-dioxaphosphorinane, 2-octoxy-5,5-dimethyl dioxaphosphorinane and 2-cyclohexyloxy-5,5-diethyldioxaphosphorinane.

Also useful are the acid phosphites disclosed in U.S. Pat. No. 2,997,454.

As exemplary of these, there are suggested the following: di(phenyl) phosphite, monophenyl phosphite, mono(diphenyl) phosphite, dicresyl phosphite, di-(o-isooctylphenyl) phosphite, di-(p-2-ethylhexylphenyl) phosphite, di-n-butyl phosphite, di-2-ethylhexyl phosphite, mono-2-ethyl hexyl phosphite, diisooctyl phosphite, monoisooctyl phosphite, monododecyl phosphite, 2-ethylhexyl phenyl phosphite, 2-ethylhexyl-(n-octylphenyl) phosphite, monocyclohexyl phosphite, dicyclohexyl phosphite, di(2-cyclohexyl phenyl) phosphite, di-α-naphthyl phosphite, diphenyl phenyl phosphite, di(diphenyl) phosphite, di(2-phenyl ethyl) phosphite, dibenzyl phosphite, monobenzyl phosphite, n- butyl cresyl phosphite, didodecyl phosphite, ditetrahydrofurfuryl phosphite and difuryl phosphite.

Also useful phosphite esters are those described in U.S. Pat. Nos. 3,655,832, patented Apr. 11, 1972 to Kauder, Leistner and Hecker and 3,662,032, patented May 9, 1972 to Kauder and Leistner.

There can also be employed metal salt stabilizers of the type prescribed in the Leistner et al U.S. Pat. Nos. 2,564,646, and 2,716,092 and other patents in the field. The metal salt stabilizer is a salt of polyvalent metal and an organic acid having from six to twenty carbon atoms. The acid should be monocarboxylic, and it should not contain nitrogen atoms in the molecule. Aliphatic, aromatic, alicyclic and oxygen-containing heterocyclic monocarboxylic acids are operative, as a class. The acids may be substituted, if desired, with groups such as halogen, sulfur, and hydroxyl. The oxygen-containing heterocyclic acids include oxygen and carbon in the ring structure, of which alkyl-substituted furoic acids are exemplary. As exemplary of the acids there can be mentioned the following: caproic acid, capric acid, 2-ethyl hexoic acid, lauric acid, chlorocaproic acid, hydroxy capric acid, stearic acid, hydroxy stearic acid, palmitic acid, oleic acid, myristic acid, dodecyl thioether propionic acid $C_{12}H_{25}$—S—$(CH_2)_2$—COOH, hexahydrobenzoic acid, benzoic acid, phenylacetic acid, isobutyl benzoic acid, isopropyl benzoic acid, ricinoleic acid, p-t-butylbenzoic acid, n-hexyl benzoic acid, salicylic acid, naphthoic acid, 1-naphthalene acetic acid, orthobenzoyl benzoic acid, naphthenic acids derived from petroleum, abietic acid, dihydroabietic acid, methyl furoic acid, and half-esters of dicarboxylic acids with alcohols and polyols, such as monooctyl maleate half-esters. These are used in the form of their metal salts, particularly the alkaline earth metal salts, such as magnesium, barium, strontium and calcium, and the zinc, cadmium, lead and tin salts. Where these salts are not known, they are made by the usual types of reactions, such as by mixing the acid or anhydride with the corresponding oxide or hydroxide of the metal in a liquid solvent, and heating, if necessary, until salt formation is complete. The barium, cadmium and zinc compounds are preferred.

Also effective stabilizers are organic compounds containing at least one epoxy group. These compounds can be used to supplement the essential stabilizers. The amount can range from 0 to 100 parts by weight per 100 parts of resin, depending upon the effect desired, for many epoxy compounds are also plasticizers for polyvinyl chloride resins, as will be noted in the discussion which follows.

Any epoxy compound can be used. The compounds can be aliphatic or cycloaliphatic in character, but aromatic, heterocyclic, and alicyclic groups can also be present. The compounds have from ten to one hundred fifty carbon atoms. The longer chain aliphatic compounds of twenty-two carbon atoms and more are also plasticizers.

Typical epoxy compounds that are not plasticizers are epoxy carboxylic acids such as epoxy stearic acid, glycidyl ethers of polyhydric alcohols and phenols, such as triglycidyl glycerine, diglycidyl ether of diethylene glycol, glycidyl epoxy stearyl ether, 1,4-bis(2,3-epoxypropoxy) benzene, 4,4'-bis(2,3-epoxypropoxy) diphenyl ether, 1,8-bis(2,3-epoxypropoxy) octane, 1,4-bis(2,3-epoxypropoxy) cyclohexane, and 1,3-bis(4,5-epoxypentoxy) 5-chlorobenzene, the epoxy polyethers of polyhydric phenols, obtained by reacting a polyhydric phenol with a halogen-containing epoxide or dihalohydrin, such as the reaction products or resorcinol, catechol, hydroquinone, methyl resorcinol, or polynuclear phenols such as 2,2'-bis(4-hyroxyphenyl) propane (Bisphenol A), 2,2'-bis(4-hydroxyphenyl) butane, 4,4'-dihydroxy-benzophenone and 1,5-dihydroxy naphthalene with halogen-containing epoxides such as 3-chloro-1,2-epoxybutane, 3-chloro-1,2-epoxyoctane, and epichlorhydrin. Typical epoxy compounds that combine stabilizing with plasticizing action are listed above under plasticizers.

A total of from 0.1 to 10 parts by weight of the heat stabilizers can be use for each 100 parts by weight of the resin. More stabilizer composition can be used, but usually no better results are obtained, and therefore such amounts are uneconomical and wasteful. The proportion of phosphite stabilizer added can be from 0.1 to 10 parts by weight but is preferably from 0.5 to 5 parts.

A small amount, usually not more than 1.5% of a parting agent also can be included. Typical parting agents are the higher aliphatic acids having from twelve to twenty-four carbon atoms, such as stearic acid, lauric acid, palmitic acid and myristic acid, mineral lubricating oils, polyvinyl stearate, polyethylene, paraffin wax and oxidized Montan wax derivatives.

The preparation of the stabilized composition is easily accomplished by conventional procedures. The selected stabilizer combination ordinarily is mixed with the plasticizer, if any, and this then is blended with the polyvinyl chloride resin, using, for instance, plastic mixing rollers at a temperature at which the mix is fluid and thorough blending facilitated, milling the plasticizer and stabilizer with the resin on a two-roll mill at from 250° to 250° F., for a time sufficient to form a homogeneous sheet, three to five minutes, usually. After the mass is uniform, it is sheeted off in the usual way.

The following Examples in the opinion of the inventors represent preferred embodiments of the invention.

EXAMPLE 1

(a) The reversible yellow to orange discoloration developed by polyvinyl chloride resin when heated in the presence of water at temperatures above about 80° C. was duplicated in the laboratory by heating and stirring together at 100° C. polyvinyl chloride resin homopolymer powder and demineralized water (pH 5) in the proportion of 150 parts polymer to 350 parts water. The heating at 100° C. was continued for 16 hours, after which the polyvinyl chloride resin powder had turned a light orange.

(b) The effectiveness of N,N'-diphenyl urea in preventing the development of this discoloration was shown by the following experiment: To the same polyvinyl chloride resin powder, 150 parts by weight and 350 parts by weight water, was added 0.25% by weight N,N'-diphenyl urea. The resulting composition was then heated at 100° C. for 16 hours, filtered to collect the heated resin, and allowed to air dry for one day at room temperature. At the end of this time, the polyvinyl chloride resin remained substantially unchanged in color.

(c) This experiment was repeated using 0.1% N,N'-diphenyl urea. The polyvinyl chloride resin homopolymer remained substantially unchanged in color following 16 hours of heating at 100° C.

(d) To the solution containing orange polymer at pH 5 was added 0.1 and 0.25 part of N,N'-diphenyl urea, and the solutions were then heated to 100° C. After 16 hours, the color was fully discharged, and the polymer particles were white, comparable in color to compositions (b) and (c), to which N,N'-diphenyl urea had been added in the beginning.

(e) Using the same test procedure as (b) and (c), the following additives were found to be ineffective, in the amounts indicated:

| Additive | Amount (% by weight of resin) |
|---|---|
| Lauryl thiodipropionate | 0.25% |
| $K_2CO_3$ | 0.5% |
| $K_2CO_3$ | 0.5% |
| Zinc Acetate | 0.25% |
| Monobutyl tin sulfide | 0.25% |
| Isooctylthioglycolate | 0.25% |
| $K_2CO_3$ | 0.5% |
| Pentaerythritol | 0.25% |
| $Na_2HPO_4$ | 0.5% |
| Sodium 2-ethylhexyl polyphosphate | 0.5% |
| Triisopropanolamine | 0.25% |
| $Na_2EDTA$ | 0.25% |
| Oxanilide | 0.25% |
| Uric Acid | 0.25% |
| 1,3,5-Tris(3,5-di-t-butyl-4-hydroxy benzyl-isocyanurate) | 0.25% |
| Urea | 0.25% |
| 2(2'-Hydroxy-5'-methylphenyl) benzotriazole | 0.25% |
| Epoxidized Soyabean Oil | 0.9% |
| Zn Stearate | 0.1% |
| Epoxidized Soyabean Oil | 1% |
| Zn Octoate | 0.04% |
| Calcium Benzoate | 0.5% |
| Zinc Benzoate | 0.5% |
| Epoxidized Soyabean Oil | 1% |
| Calcium Benzoate | 0.5% |
| Zinc Benzoate | 0.5% |
| Epoxidized Soyabean Oil | 1% |
| Calcium Benzoate | 0.5% |
| Zinc Benzoate | 0.5% |
| Tris (nonylphenyl) phosphite | 0.5% |
| Thiodipropionic acid | 0.25% |
| Thiodipropionic acid | 0.25% |
| Zinc Octoate | 0.1% |
| Thiodipropionic acid | 0.25% |
| Epoxidized Soyabean Oil | 0.9% |
| Zn Stearate | 0.1% |
| 1,1,3-Tris(2-methyl-4-hydroxy-5-t-butyl phenyl) butane | 0.25% |
| 1,1,3-Tris(2-methyl-4-hydroxy-5-t-butyl phenyl) butane | 0.25% |
| Thiodipropionic acid | 0.25% |
| 1,1,3-Tris(2-methyl-4-hydroxy-5-t-butyl phenyl) butane | 0.25% |
| Thiodipropionic acid | 0.25% |
| Zinc Octoate | 0.1% |
| 2,6-di-t-butyl-paracresol | 0.25% |
| Pentaerythritol tetrakis (3,5-di-t-butyl-4-hydroxy-hydrocinnamate) | 0.25% |

Phenyl indole was effective, but interferes with vinyl chloride polymerization, N,N'-diphenyl thiourea was effective, but produced a yellow color when treated vinyl chloride polymer was combined with cadium-containing heat stabilizers. The organotin mercaptides both interfered with vinyl chloride polymerization and produced a yellow color when treated vinyl chloride polymer was combined with cadium-containing heat stabilizers. None of these can be used. N,N'-diphenyl urea showed none of these disadvantages.

Having regard to the foregoing disclosure, the following is claimed as the inventive and patentable embodiments thereof:

1. A process for inhibiting the development of a yellow to orange discoloration by polyvinyl chloride polymers when heated in the presence of water at a temperature within the range from about 80° to about 200° C., which comprises mixing an N,N'-diphenyl urea with the polymer in an amount within the range from about 0.005 to about 10 parts by weight per 100 parts of polymer and then heating the polyvinyl chloride polymer in the presence of water at a temperature above 80° C. up to about 200° C.

2. A process according to claim 1, which includes removing water and drying the polymer during the heating.

3. A process according to claim 2, which comprises spray-drying the polymer.

4. A process according to claim 2, which comprises flash-drying the polymer.

5. A process according to claim 2, which comprises steam-stripping the polymer.

6. A process according to claim 2, in which the dried polymer is combined with a polyvinyl chloride resin heat stabilizer.

7. A process according to claim 6, in which the heat stabilizer is a salt of polyvalent metal and a ninnitrogenous organic acid having from six to twenty carbon atoms.

8. A process according to claim 7, in which the metal salt is an alkaline earth metal salt.

9. A process according to claim 6, in which the heat stabilizer is an organic compound containing at least one epoxy group.

10. A process according to claim 6, in which the heat stabilizer is an organic phosphite.

11. A process according to claim 6, in which the heat stabilizer is an organotin compound.

12. A process according to claim 1, in which the polymer is polyvinyl chloride resin homopolymer.

13. A process according to claim 1, in which the polymer is a copolymer of vinyl chloride and vinyl acetate.

14. A process according to claim 1, in which the polymer is a copolymer of vinyl chloride and ethylene.

15. A process according to claim 1, in which the polymer heated in the presence of water comprises the polymer and a plasticizer for the polymer.

16. A process according to claim 1, in which the N,N'-diphenyl urea is incorporated directly in an aqueous composition containing the polymer and a vinyl chloride monomer, which is heated to remove vinyl chloride monomer.

17. A process according to claim 16, in which the N,N'-diphenyl urea is incorporated directly in an aqueous composition containing a polyvinyl chloride emulsion polymerization reaction product.

18. A process according to claim 1, in which the N,N'-diphenyl urea is incorporated in an aqueous composition containing the polymer and a vinyl chloride monomer before polymerization to form polyvinyl chloride.

19. A process according to claim 1, in which the N,N'-diphenyl urea is incorporated directly in an aqueous composition containing a polyvinyl chloride suspension polymerization reaction product.

20. A process according to claim 19 in which the aqueous composition has a pH within the range of from about 3 to about 11.

21. A process according to claim 1 in which the N,N'-diphenyl urea is N,N'-diphenyl urea.

22. A process according to claim 1, in which the N,N'-diphenyl urea has the formula:

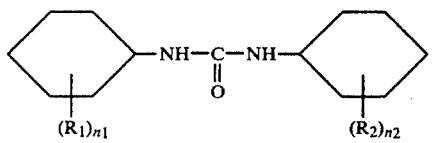

wherein:

R₁ and R₂ are selected from the group consisting of halogen, alkyl, cycloalkyl, and alkoxy of from one to about twenty carbon atoms; and $n_1$ and $n_2$ are integers from zero to five.

23. A process according to claim 22 in which $R_1$ and $R_2$ are in the para position.

24. A process according to claim 22 in which $n_1$ and $n_2$ are each one.

25. A polyvinyl chloride polymer prepared according to the process of claim 1.

26. An aqueous polyvinyl chloride polymer composition having a tendency to develop a yellow to orange discoloration when heated at a temperature within the range from about 80° to about 160° C., comprising water and polyvinyl chloride polymer, and an N,N′-diphenyl urea in an amount sufficient to inhibit the development of such discoloration at such temperatures.

27. An aqueous polyvinyl chloride polymer composition according to claim 26 in which the composition is a polyvinyl chloride emulsion polymerization reaction product.

28. An aqueous polyvinyl chloride polymer composition according to claim 26 in which the aqueous composition is a polyvinyl chloride suspension polymerization reaction product.

29. An aqueous polyvinyl chloride polymer composition according to claim 26 in which the aqueous composition has a pH within the range from about 3 to about 11.

30. An aqueous polyvinyl chloride polymer composition according to claim 26 in which the polymer is vinyl chloride homopolymer.

31. An aqueous polyvinyl chloride polymer composition according to claim 26 in which the polymer is a copolymer of vinyl chloride and vinyl acetate.

32. An aqueous polyvinyl chloride polymer composition according to claim 26 in which the polymer is a copolymer of vinyl chloride and ethylene.

33. An aqueous polyvinyl chloride polymer composition according to claim 26 in which the polymer heated in the presence of water comprises the polymer and a plasticizer for the polymer.

34. An aqueous polyvinyl chloride polymer composition according to claim 26 in which the N,N′-diphenyl urea is N,N′-diphenyl urea.

35. An aqueous polyvinyl chloride polymer composition according to claim 26 in which the N,N′-diphenyl urea has the formula:

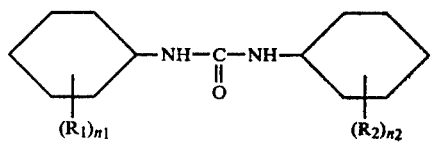

wherein:

R₁ and R₂ are selected from the group consisting of halogen, alkyl, cycloalkyl, and alkoxy of from one to about twenty carbon atoms; and $n_1$ and $n_2$ are integers from zero to five.

36. An aqueous polyvinyl chloride polymer composition according to claim 35 in which $R_1$ and $R_2$ are in the para position.

37. An aqueous polyvinyl chloride polymer composition according to claim 35 in which $n_1$ and $n_2$ are each one.

38. A process according to claim 1 in which the N,N′-diphenyl urea is incorporated directly in an aqueous composition containing the polymer and a vinyl chloride monomer, which is dried.

39. A process according to claim 1 in which the N,N′-diphenyl urea is incorporated directly in an aqueous composition containing the polymer and a vinyl chloride monomer, which is heated to remove vinyl chloride monomer and dried.

* * * * *

UNITED STATES PATENT AND TRADEMARK OFFICE
CERTIFICATE OF CORRECTION

PATENT NO. : 4,252,705
DATED : February 24, 1981
INVENTOR(S) : Lawrence R. Brecker It is certified that error appears in the above-identified patent and that said Letters Patent are hereby corrected as shown below:

| | | |
|---|---|---|
| Column 4, line 53 | : | "acidds" should be --acids-- |
| Column 6, line 31 | : | after "thio" insert --and mixed oxo thio phosphites. Usually, the phosphite will not have more -- |
| Column 6, line 46 | : | "tio" should be --thio-- |
| Column 8, line 2 | : | "or" should be --of-- |
| Column 8, line 34 | : | "250°" (second occurrence) should be --350°-- |
| Column 10, lines 21 & 22 | : | "ninnitrogenous" should be --nonnitrogenous-- |

Signed and Sealed this

Seventh Day of January 1986

[SEAL]

Attest:

DONALD J. QUIGG

Attesting Officer

Commissioner of Patents and Trademarks